April 17, 1956  A. H. FLATER  2,742,561
MOUNTING MEANS FOR EXTERNALLY APPLIED HEATING ELEMENTS
Filed June 28, 1954
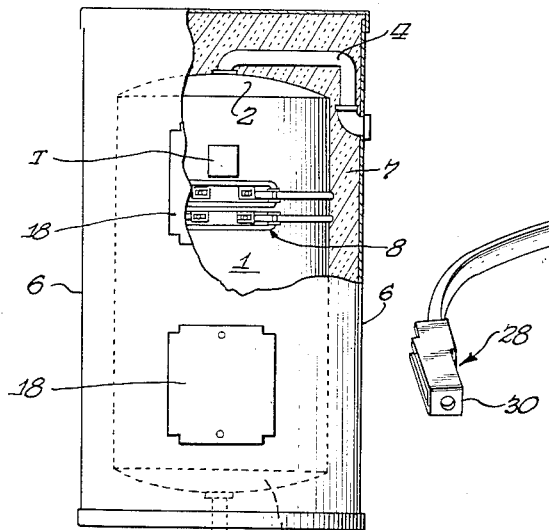
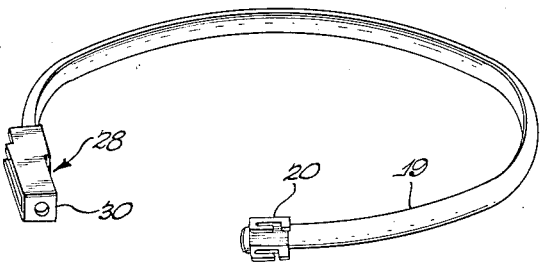
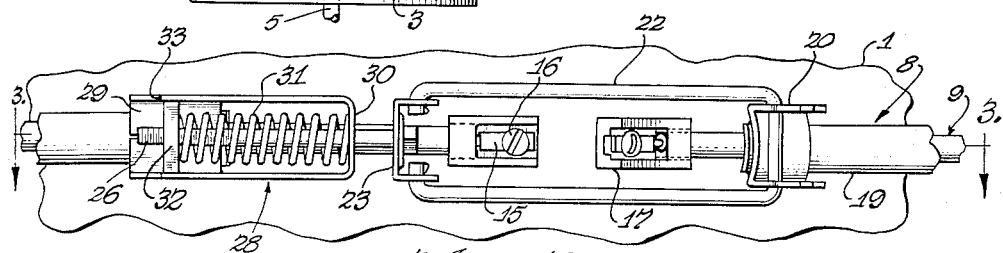
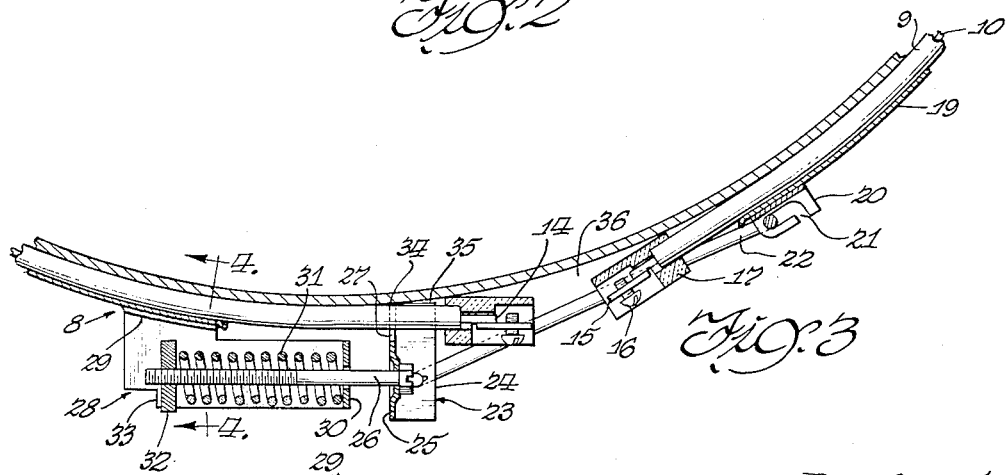
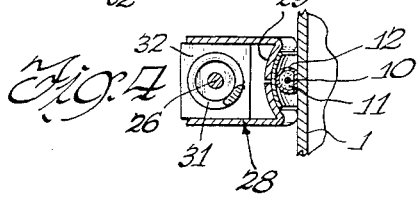
Inventor
Anders H. Flater
by Andrew L. Hubbard
Atty.

United States Patent Office 2,742,561
Patented Apr. 17, 1956

2,742,561

MOUNTING MEANS FOR EXTERNALLY APPLIED HEATING ELEMENTS

Anders H. Flater, Chicago, Ill., assignor to General Electric Company, a corporation of New York Application June 28, 1954, Serial No. 439,641

10 Claims. (Cl. 219—38)

This invention relates to heating devices for application to the exterior surface of a heat-exchange vessel such as the storage tank of water heating apparatus or the like in which the contents of the vessel are to be heated by heat transfer through the walls of the vessel. In particular, the invention relates to a novel latching and clamping device which maintains the heating unit in good thermal contact with the wall of the vessel.

It is now well established that in water heaters of the storage type, for example, externally applied electric heating elements have certain operating advantages as compared with submerged electric heating elements. For example, the external units are not subject to liming or corrosion, and they may be removed for replacement without requiring drainage of the storage tank. It is the present practice to support the external heating elements by resilient clamping means which hold the elements in good thermal contact with the tank wall. Presently used mounting structures, however, are relatively expensive to manufacture and tend to "walk" about the tank by reason of the unequal expansion of elements of the mounting structure and other components of the heating element as it heats and cools under control of a thermostat. It is therefore an object of the present invention to provide an inexpensive heating device of the externally mounted type in which the heating element will be maintained in good thermal contact against the wall of the vessel regardless of the expansion and contraction of the heating element or its mounting means.

It is another object of the invention to provide an externally mounted heating device which will not migrate about the tank.

It is a further object of the invention to provide an externally mounted heating device which permits easy removal and replacement of the heating element.

In the water heater art it has been the practice to utilize a tubular metallic sheathed electric heating element of sufficient flexibility to be curved about the wall of a storage tank having an outside diameter in the range of from 16 to 21 inches, and to confine said heating element against the tank by means of a concave clamping strip of sheet metal having a width of the order of twice the diameter of the heating element sheath and a length not quite co-extensive therewith. These essentially basic heating element and clamping strip components are retained in the present invention. In association therewith, however, I provide resilient adjustable means for releasably connecting the respective ends of the clamping strip; and as part of said connecting means disposed intermediate the ends of the clamping strip, provide a rockable friction member which is resiliently urged against the wall of the tank with sufficient force to prevent movement of the heating unit assembly relative to the tank.

Other features and advantages of the invention will best be understood from the following detailed description of a preferred embodiment, read in connection with the accompanying drawing in which:

Fig. 1 is a side elevation of a storage type electric water heater utilizing the invention with certain portions of the exterior casing and insulation removed to reveal underlying structure;

Fig. 2 is a front elevation of the latching means embodying the invention;

Fig. 3 is a plan section of said latching means and adjacent heating element and clamping strip, as viewed along lines 3—3 of Fig. 2;

Fig. 4 is a vertical sectional elevation taken on lines 4—4 of Fig. 3; and

Fig. 5 is a perspective view of a typical clamping strip embodying components of the present invention.

Referring to the drawing, the invention has been shown in one form as applied to a cylindrical water heating and storage tank 1, having upper and lower heads 2, 3 to which are respectively connected the hot water outlet pipe 4 and the cold water inlet pipe 5. The tank is enclosed in a generally cylindrical housing 6 and the space between the wall of the housing and the tank is occupied by thermal insulation 7, such as fibrous rock wool or glass wool.

The tank is provided with electrical heating units 8 for applying heat to the exterior surface of the tank, as now well known in the art. For example, each heating unit may comprise a heating element 9 of the tubular sheathed conductor type, in which an electrical resistance element 10 is imbedded in a highly compacted body 11 of electrically insulating and thermally conducting material such as magnesium oxide. The body 11 maintains the heating element in electrically insulated spaced relation with a tubular metallic sheath 12, which for water heater service may be of brass. Terminals 14 are affixed to the heating element—for example, by the method disclosed in Oakley U. S. Patent 2,546,315, granted March 27, 1951, for "Electric Heater;" and to said terminals 14 are conventionally secured connectors 15 to which the power conductors (not shown) may be attached by means of the illustrated binding screws 16. Conventional ceramic insulators 17 may be slipped over the terminals 14, connectors 15, and the ends of the sheath 12, upon removal of the binding screws.

In an electric water heater it is often the practice to place one or more of the heating units 8 about an upper portion of the tank and one or more of the units (not shown) about a lower portion of the tank. Each set of units may be under the control of a conventional thermostat T, which is responsive to the temperature of the tank wall and controls the electrical energy to the heating units, as is now well understood. The removable access panels 18 afford entry to the inside of the water heater casing for servicing the heating elements and thermostats.

It is apparent from Figs. 3 and 4 that heat transfer from the heating element to the tank is essentially only by conduction, and it is therefore necessary to maintain the heating elements in tight contact with the wall of the tank. It has been the practice to employe spring-loaded devices in connection with a clamping band and hundreds of thousands of clamping devices such as disclosed in Vogel et al. Patent 2,452,214, granted October 26, 1948, for "Clamp-on Electric Heater for Water Tanks and the Like" have been used on water heaters manufactured and sold by applicant's assignee herein. The clamping devices of the said Vogel et al. patent have been eminently successful as respects the clamping effort exerted thereby, the ease of installation of heating units embodying the same, and the facility whereby heating elements may be removed and replaced. It has been noted however that heating units having the clamping means of the Vogel et al. patent exhibit a tendency to "walk" circumferentially about the tank by reason of the stresses and resultant movement incident to the heating and cooling of the heating units as they are energized and de-energized by operation of the associated thermostat. The expansion and contraction of the respective elements is an appreciable factor in actual operation. In a typical installation, for example, in which the water content of the storage tank is to be raised to 150° F., the sheath temperature at the portion in direct thermal contact with the tank may be of the order of 200° F., whereas the temperature of the clamping band which is in pressure contact with the sheath of the heating element may be of the order of 600° F. It has been determined that mere pressure contact of a relatively large area portion of the heating unit clamping means against the wall of the tank is not adequate to prevent the movement of the heating unit above described.

Pursuant to the present invention, I provide a heating unit clamping device which not only maintains resilient pressure to hold the heating elements in good thermal relationship with the tank wall, but applies the resilient effort in a manner which eliminates any possibility of movement of the heating unit about the tank.

In the presently preferred form of the invention disclosed, the heating element sheath has the usual flattened wall portion in contact with the tank, as seen best in Fig. 4. A concave sheet metal clamping strip 19 fits over the heating element for a large portion of the length thereof; the terminal end portions of the heating unit project beyond the clamping strip.

The tension applying device provides for complete accessibility of the terminal portions 15 and insulators 17 of the heating unit and at the same time provides a substantial measure of protection therefor. An anchor 20 welded to one end of the clamping band is of channel shape with its wall portions formed with an angular slot 21 to releasably and pivotally receive the closed end portion of a heavy wire latching link 22. A rigid channel like member 23 is arranged to be urged into such firm frictional contact with the wall of the tank as to preclude movement of the heating unit about the tank. This pressure contact results from arranging the resilient clamping means so that a component of the forces exerted thereby drives the member 23 in a generally radial direction against the wall of the tank. The side walls 24 of the member 23 rotatably receive the inturned ends of the link 22 and the web portion 25 of said member is embossed and pierced to relatively loosely receive the tensioning screw 26. As shown in Fig. 3, the web portion 25 of the member 23 has an aperture 27 to accommodate the free passage of the heating element 9.

To the other end of the clamping strip 19, I affix the rigid spring retainer 28. Said retain, as best appears in Figs. 2 and 5, is channel shape, and has a bottom portion 29 shaped to fit the clamping strip 19, to which it is welded or otherwise firmly attached. The closed end 30 has a relatively large aperture to freely receive the screw 26. A relatively heavy coil spring 31 is housed within the retainer 28 and is confined between the end wall 30, thereof and the large nut 32 through which the screw 26 is threaded. As shown in Fig. 4, nut 32 has a substantial area of engagement with the side walls of the retainer 29 and is supported thereby against turning when the screw 26 is tightened. The side walls of the retainer are notched as at 33 to establish a gauge indicative of the attainment of proper compression of spring 31. When the screw 26 has been made up until the nut 32 has been drawn just beyond the notch 33, the proper compression has been obtained. At this point member 23 is essentially radial with respect to the tank and its rear edge 34 is being forced against the tank. The pivotal attachment of the link to the friction member is radially outward of the pivot point of the link and anchor 20. Spring 31 is urging the link into clockwise rotation, as viewed in Fig. 3, and is therefore driving the member 23 against the tank wall. Stability of the member 23 is provided by having the line of effort of the spring pass through the pivot point of the link and member 23. The base 35 of member 23 is desirably square relative to the web 25 thereof. This configuration of the member 23 provides the relatively sharp edge portion 34 which not only engages the tank wall securely and provides frictional resistance to circumferential movement on the tank, but establishes a pivot edge about which the element can rock as the heating elements expand and contract in use. The firm pressure of the member 23 against the tank wall, plus the freedom of the member to rock or pivot, hold the heating unit against migration on the tank wall.

In first applying the heating unit at the time of manufacture, the heating element 9 is given a preliminary circular configuration about a suitable jig (not shown) and is placed within the previously assembled clamping device. At this time, the bolt 26 is merely serving to maintain the several clamping device elements in assembled fashion. The thus assembled heating device is then placed over the end of the tank and slid into its ultimate location, whereupon the bolt 26 may be made up to place the desired loading on spring 31. When all of the heating units have been positioned, the insulators 17 are applied, and binding screws 16 made up to provide for the electrical connections to the associated thermostat T and for eventual connection into the electrical power circuit. It will be noted that the link 22 of each of the units surrounds the terminal portions of the heating element and is therefore in a position to protect the terminals and insulators of the heating element against damage during subsequent operations. It will be obvious from the disclosure of Fig. 3 that there is ample space 36 between the link 22 and the tank 1 to accommodate the passage of the insulated conductors (not shown) to the thermostat and said links therefore serve to guard against the disarrangement of the conductors.

When a heating element is to be removed for replacement in the field, the appropriate cover plate 18 is removed to expose the heating elements therebeneath. The electrical lead wires are disconnected and the terminal screws 16 removed. This permits the insulators 17 to be removed from the terminal ends of the heating element. Then the bolt 26 is slacked off to relieve the tightness with which the heating element was clamped against the tank. With a pair of pliers or equivalent, the mechanic grasps one of the terminal ends of the heating unit and withdraws the unit from the water heater tank. The heating elements are sufficiently flexible to permit them to be slid about the storage tank beneath the clamping strip 19, and the removal of the old element and insertion of a new one is readily accomplished. When the terminal ends of the new heating element are approximately in the Fig. 2 position, the bolt 26 may be tightened, as previously noted. The insulators 17 are positioned, the screws 16 attached, and the electrical leads completed to the new unit.

While there has been described what is at present considered to be the preferred embodiment of the invention, it will be understood that various modifications may be made therein, and it is intended to cover in the appended claims all such modifications as fall within the true spirit and scope of the invention.

I claim:

1. In a heat exchange vessel having a substantially cylindrical wall and a flexible, rod-like heating element disposed about said wall in electrically insulated relation therewith, the terminal ends of said heating element being in mutually spaced relation in a common plane, clamping means for maintaining said heating element in good thermal conductive contact with the wall of said vessel, comprising a concave flexible clamping strap adapted to overlie and partially envelop said heating element for a substantial portion of the length thereof, a latching link releasably attached to one end of said strap, a friction member pivotally affixed to said link and disposed thereby intermediate the ends of said clamping strap, and spring means secured to the other end of said strap and engaging said friction member to urge the same into frictional contact with said side wall while placing said strap under tension to tightly confine said heating element against the wall of said vessel.

2. Heating element clamping means according to claim 1, in which said latching link comprises a loop-like structure extending about the terminal ends of said heating element.

3. In a heat exchange vessel having a substantially cylindrical wall and a flexible, rod-like heating element disposed about said wall in electrically insulated relation therewith, the terminal ends of said heating element being in mutually spaced relation in a common plane, and including means for attachment to power conductors, clamping means for maintaining said heating element in good thermal conductive contact with the wall of said vessel, comprising a concave flexible clamping strap adapted to overlie and partially envelop said heating element, said clamping strap terminating short of the terminal ends of said heating element, a latching link pivotally attached to one end of said strap, a rigid friction member pivotally affixed to said link and disposed thereby intermediate the ends of said clamping strap substantially radial of said cylindrical wall, and spring means secured to the other end of said strap and engaging said friction member to urge the same into frictional contact with said side wall in pivotal relation therewith while placing said strap under tension to tightly confine said heating element against the wall of said vessel.

4. Clamping means according to claim 3, in which the pivotal connection between said link and said friction member is radially outward, as respects said cylindrical wall, of the pivotal connection between said link and said strap.

5. Clamping means according to claim 4, in which the line of effort of said spring means passes substantially through the point of pivotal connection between said link and said friction member.

6. In a heat exchange vessel having a substantially cylindrical side wall and a flexible, rod-like heating element disposed about said wall in electrically insulated relation therewith, the terminal ends of said heating element being in mutually spaced relation, clamping means for maintaining said heating element in good thermay conductive contact with the wall of said vessel throughout a substantial portion of the circumference thereof, comprising a concave flexible clamping strap adapted to overlie and partially envelop said heating element, said clamping strap terminating short of the terminal ends of said heating element, a latching pink pivotally attached to one end of said strap, a rigid friction member pivotally affixed to said link and disposed thereby intermediate the ends of said clamping strap, said friction member straddling one end portion of said heating element, and spring means secured to the other end of said strap and engaging said friction member to urge the same into rotatable frictional contact with said side wall while placing said strap under tension to tightly confine said heating element against the wall of said vessel.

7. Clamping means according to claim 6, in which said friction member engages said wall along substantially a line contact normal to the line of effort of said spring means.

8. In a heat exchange vessel having a substintially cylindrical side wall and a flexible, rod-like heating element disposed about said wall in electrically insulated relation therewith, the terminal ends of said heating element being in mutually spaced relation, clamping means for maintaining said heating element in good thermal conductive contact with the wall of said vessel throughout a substantial portion of the circumference thereof, comprising a flexible sheet metal clamping strap adapted to overlie said heating element, said clamping strap terminating short of the ends of said heating element, a channel-like friction member disposed intermediate the ends of said clamping strap, a latching link pivotally attached to one end of said clamping strap and pivotally engaging the side walls of said friction member radially outward of said attachment to said clamping strap, considered relative to said vessel wall, a substantially channel-shaped spring anchor member secured to the opposite end of said clamping strap, spring means disposed within said anchor member and extending longitudinally of said strap, a tension bolt extending between the web of said friction member and said spring means, and a nut on said tension bolt for compressing said spring means to place said clamping strap under tension, the line of effort of said tension bolt intersecting the pivot point of said latching link with said friction member to form with said latching link an obtuse angle subtended by said cylindrical vessel wall.

9. Clamping means according to claim 8, in which the side walls of said friction member are parallel to the line of effort of said tension bolt.

10. Clamping means according to claim 8, in which side walls of said channel-like spring anchor have means related to the tension bolt nut to indicate the proper effective length of said tension bolt relative to said spring.

References Cited in the file of this patent
UNITED STATES PATENTS

| | | |
|---|---|---|
| 2,237,151 | Knez | Apr. 1, 1941 |
| 2,452,214 | Vogel et al. | Oct. 26, 1948 |